US010705565B2

(12) United States Patent
Park

(10) Patent No.: US 10,705,565 B2
(45) Date of Patent: Jul. 7, 2020

(54) FOLDABLE DISPLAY DEVICE

(71) Applicant: Samsung Display Co., Ltd., Yongin-si (KR)

(72) Inventor: Dong Jin Park, Seongnam-si (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 16/272,717

(22) Filed: Feb. 11, 2019

(65) Prior Publication Data
US 2019/0250663 A1    Aug. 15, 2019

(30) Foreign Application Priority Data
Feb. 12, 2018 (KR) .................. 10-2018-0016995

(51) Int. Cl.
G06F 1/16 (2006.01)
(52) U.S. Cl.
CPC .......... G06F 1/1618 (2013.01); G06F 1/1641 (2013.01); G06F 1/1652 (2013.01); G06F 1/1681 (2013.01); G06F 2203/04102 (2013.01)
(58) Field of Classification Search
CPC .............................. G06F 1/1652; G06F 1/1681
See application file for complete search history.

(56) References Cited

U.S. PATENT DOCUMENTS

| 5,896,575 | A * | 4/1999 | Higginbotham | G06F 1/16 455/557 |
| 7,142,195 | B2 * | 11/2006 | Northway | G06F 1/1626 345/169 |
| 7,289,083 | B1 * | 10/2007 | Canova, Jr. | G06F 1/1622 345/1.1 |
| 7,566,902 | B2 * | 7/2009 | Nakashima | G09G 3/3225 257/202 |
| 8,362,992 | B2 * | 1/2013 | Kuhlman | G02F 1/13306 345/1.1 |
| 8,493,364 | B2 * | 7/2013 | Charlier | G06F 1/1616 345/173 |
| 8,810,524 | B1 * | 8/2014 | Rosenberg | G06F 1/1643 345/1.1 |
| 9,173,287 | B1 | 10/2015 | Kim et al. | |
| 9,176,535 | B2 | 11/2015 | Bohn | |
| 9,191,473 | B2 * | 11/2015 | Shimada | G06F 3/041 |
| 9,489,913 | B2 * | 11/2016 | Kwak | G06F 3/0487 |
| 10,120,415 | B2 | 11/2018 | Seo et al. | |
| 2010/0087229 | A1 * | 4/2010 | Maatta | H04M 1/0266 455/566 |

(Continued)

FOREIGN PATENT DOCUMENTS

| KR | 10-20130073331 | 7/2013 |
| KR | 10-2016-0035146 | 3/2016 |

(Continued)

Primary Examiner — Adrian S Wilson
(74) Attorney, Agent, or Firm — H.C. Park & Associates, PLC

(57) ABSTRACT

A foldable display device including: a flexible display panel including a bending portion; and a folding unit supporting the flexible display panel and in-folding and out-folding a front surface of the flexible display panel. The folding unit includes a hinge unit bending and supporting the bending portion of the flexible display panel simultaneously in a clockwise direction and a counterclockwise direction.

24 Claims, 13 Drawing Sheets

(56) References Cited

U.S. PATENT DOCUMENTS

| | | | |
|---|---|---|---|
| 2010/0277439 A1* | 11/2010 | Charlier | G06F 1/1616 |
| | | | 345/176 |
| 2012/0314399 A1 | 12/2012 | Bohn et al. | |
| 2013/0010405 A1 | 1/2013 | Rothkopf et al. | |
| 2014/0098095 A1* | 4/2014 | Lee | G06F 3/041 |
| | | | 345/420 |
| 2014/0355195 A1* | 12/2014 | Kee | G06F 1/1616 |
| | | | 361/679.27 |
| 2015/0023030 A1* | 1/2015 | Tsukamoto | G06F 1/1652 |
| | | | 362/419 |
| 2015/0062840 A1* | 3/2015 | Kim | G06F 1/1652 |
| | | | 361/749 |
| 2015/0077917 A1* | 3/2015 | Song | G06F 1/1652 |
| | | | 361/679.27 |
| 2015/0131222 A1* | 5/2015 | Kauhaniemi | G06F 1/1652 |
| | | | 361/679.27 |
| 2015/0279270 A1* | 10/2015 | Sterling | G06F 1/163 |
| | | | 345/173 |
| 2016/0116944 A1* | 4/2016 | Lee | H04M 1/022 |
| | | | 361/679.26 |
| 2016/0139634 A1* | 5/2016 | Cho | G06F 1/1652 |
| | | | 361/679.27 |
| 2016/0187935 A1* | 6/2016 | Tazbaz | G06F 1/1681 |
| | | | 361/679.03 |
| 2016/0320804 A1* | 11/2016 | Takayanagi | G06F 1/1615 |
| 2016/0349802 A1* | 12/2016 | Ahn | G06F 1/1641 |
| 2016/0370829 A1* | 12/2016 | Hsu | G06F 1/1681 |
| 2016/0378203 A1 | 12/2016 | Kim et al. | |
| 2017/0208699 A1* | 7/2017 | McDermid | G06F 1/1652 |
| 2017/0303414 A1* | 10/2017 | Chu | H05K 5/0017 |
| 2018/0059734 A1* | 3/2018 | Knoppert | G06F 1/1681 |
| 2018/0101200 A1* | 4/2018 | Myeong | G02F 1/133305 |
| 2018/0150107 A1* | 5/2018 | Lee | H04M 1/0216 |
| 2018/0192528 A1* | 7/2018 | Lin | H05K 5/0217 |
| 2018/0275715 A1* | 9/2018 | Park | G06F 1/16 |
| 2018/0275722 A1* | 9/2018 | Lo | H04M 1/0268 |
| 2018/0314299 A1* | 11/2018 | Xia | G09F 9/30 |
| 2018/0317333 A1* | 11/2018 | Bi | G02F 1/13 |
| 2019/0196541 A1* | 6/2019 | O'Neil | G06F 1/1616 |

FOREIGN PATENT DOCUMENTS

| | | |
|---|---|---|
| KR | 10-2017-0018909 | 3/2016 |
| KR | 10-2017-0026023 | 2/2017 |
| KR | 10-1752708 | 7/2017 |
| WO | 2012-167204 | 12/2012 |
| WO | 2012-170593 | 12/2012 |
| WO | 2015126068 | 8/2015 |
| WO | 2015-191411 | 12/2015 |
| WO | 2016-208857 | 12/2016 |

\* cited by examiner

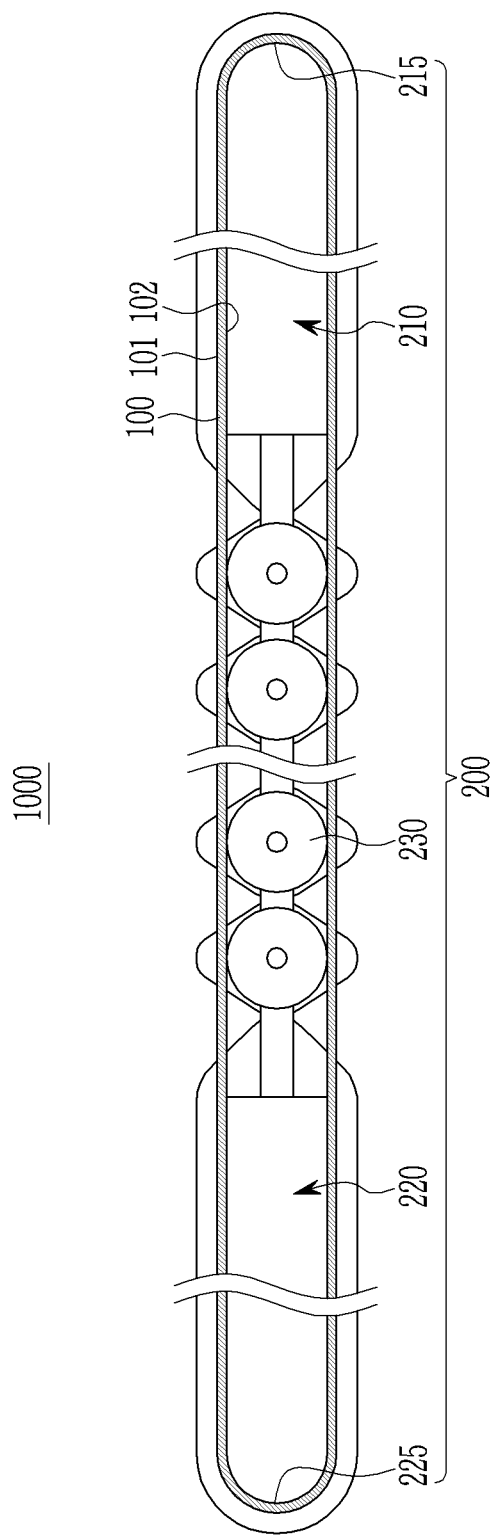

FOLDABLE DISPLAY DEVICE

CROSS-REFERENCE TO RELATED APPLICATION

This application claims priority from and the benefit of Korean Patent Application No. 10-2018-0016995 filed on Feb. 12, 2018, which is hereby incorporated by reference for all purposes as if fully set forth herein.

BACKGROUND

Field

Exemplary embodiments of the invention relate generally to a foldable display device.

Discussion of the Background

Recently, a foldable or rollable display device including a flexible display panel including a flexible substrate has been developed.

Among them, in the foldable display device, at least part of the flexible display panel may be bent to be folded.

The above information disclosed in this Background section is only for understanding of the background of the inventive concepts, and, therefore, it may contain information that does not constitute prior art.

SUMMARY

An exemplary embodiment of the invention provides a foldable display device in which a curvature of a bending portion of the flexible display panel is minimized when being folded.

Additional features of the inventive concepts will be set forth in the description which follows, and in part will be apparent from the description, or may be learned by practice of the inventive concepts.

An exemplary embodiment of the invention provides a foldable display device including a flexible display panel including a bending portion; and a folding unit supporting the flexible display panel and configured to in-fold and out-fold a front surface of the flexible display panel. The folding unit includes a hinge unit configured to bend and support the bending portion of the flexible display panel simultaneously in a clockwise direction and a counterclockwise direction.

The flexible display panel may further include a first portion adjacent to the bending portion and a second portion separated from the first portion via the bending portion. The folding unit may further include: a first supporting portion connected to the hinge unit and configured to support the first portion; and a second supporting portion connected to the hinge unit and configured to support the second portion.

The first supporting portion and the second supporting portion may be in contact with a rear surface of the flexible display panel.

The rear surface of the flexible display panel may be attached to the first supporting portion and the second supporting portion, and the rear surface of the flexible display panel may be in contact with the hinge unit.

The hinge unit may include: a plurality of rotatable shafts disposed between the first supporting portion and the second supporting portion; a plurality of rotatable links connected between the rotatable shafts; and a plurality of folding guides supported by end portions of the rotatable shafts.

The hinge unit may further include a plurality of rollers into which the rotatable shafts are inserted.

The hinge unit may further include a coating layer coated to at least one surface among the rotatable shafts.

The links may include: a plurality of outer links connected to end portions of the rotatable shafts; and a plurality of inner links separated from the outer links and connected to a portion of the rotatable shafts.

Each of the folding guides may include: a first guide adjacent to the flexible display panel and including a plurality of first inclination surfaces that are symmetrical to each other; and a second guide separated from the flexible display panel compared with the first guide and including a plurality of second inclination surfaces that are symmetrical to each other.

The folding guides may include a first outermost folding guide adjacent to the first supporting portion.

The folding guides may further include a second outermost folding guide adjacent to the second supporting portion.

The first outermost folding guide may be rotated in a clockwise direction with respect to the first supporting portion, the remaining folding guides, except for the first outermost folding guide, may be rotated in a counterclockwise direction with respect to the first supporting portion, and the folding unit may out-fold a front surface of the flexible display panel.

The second outermost folding guide may be rotated in a counterclockwise direction with respect to the second supporting portion, and the remaining folding guides, except for the second outermost folding guide, may be rotated in a clockwise direction with respect to the second supporting portion.

The second guide of the first outermost folding guide may be separated from the first supporting portion, the second guide of the second outermost folding guide may be separated from the second supporting portion, and second guides of the plurality of folding guides may be adjacent to each other.

The first outermost folding guide may be rotated in a counterclockwise direction with respect to the first supporting portion, the remaining folding guides, except for the first outermost folding guide, may be rotated in a clockwise direction with respect to the first supporting portion, and the folding unit may in-fold the front surface of the flexible display panel.

The plurality of folding guides may further include a second outermost folding guide adjacent to the second supporting portion, the second outermost folding guide may be rotated in a clockwise direction with respect to the second supporting portion, and the remaining folding guides, except for the second outermost folding guide, may be rotated in a counterclockwise direction with respect to the second supporting portion.

The first guide of the first outermost folding guide may be separated from the first supporting portion, the first guide of the second outermost folding guide may be separated from the second supporting portion, and first guides of the plurality of folding guides may be adjacent to each other.

The first supporting portion may include a third inclination surface that is symmetrical to one among the first inclination surfaces of the first guide of the first outermost folding guide.

The first supporting portion may include a fourth inclination surface that is symmetrical to one among the second inclination surfaces of the second guide of the first outermost folding guide.

The second supporting portion may include a fifth inclination surface that is symmetrical to one among the first inclination surfaces of the first guide of the second outermost folding guide.

The second supporting portion may include a sixth inclination surface that is symmetrical to one among the second inclination surfaces of the second guide of the second outermost folding guide.

The folding unit may further include a stretchable film overlapping the hinge unit and connecting between the first supporting portion and the second supporting portion.

The flexible display panel may further include: a first sub-flexible display panel positioned at one side of the folding unit; and a second sub-flexible display panel positioned at the other side of the folding unit, and the folding unit may be positioned between the first sub-flexible display panel and the second sub-flexible display panel.

The front surface of the flexible display panel may enclose the folding unit.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the inventive concepts.

FIG. 13 is a cross-sectional view showing a foldable display device according to another exemplary embodiment.

DETAILED DESCRIPTION

Figure 1:
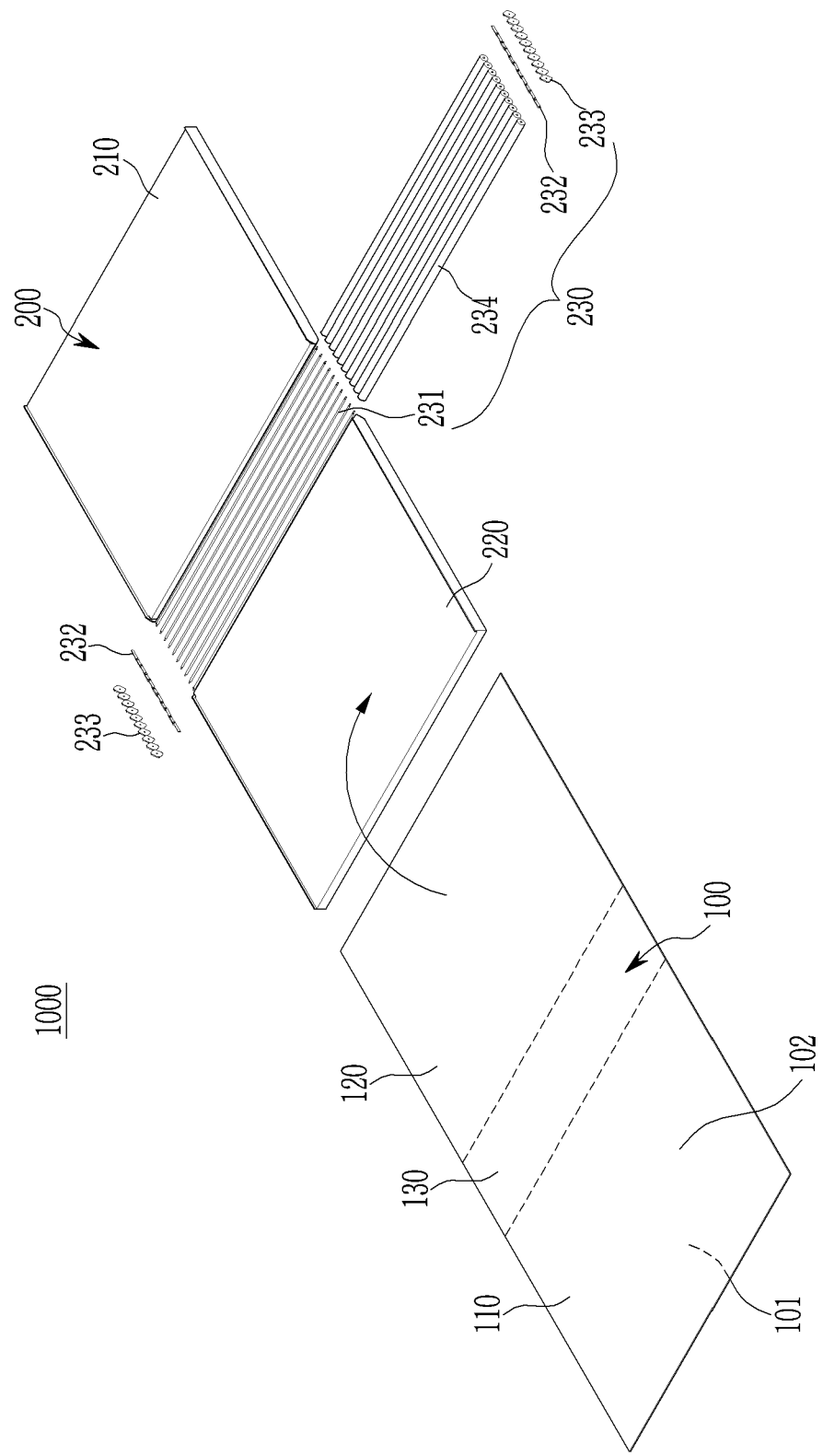
FIG. 1 is an exploded perspective view showing a foldable display device according to an exemplary embodiment.

In the following description, for the purposes of explanation, numerous specific details are set forth in order to provide a thorough understanding of various exemplary embodiments of the invention. As used herein "embodiments" are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Next, a foldable display device according to an exemplary embodiment is described with reference to FIG. 1 to FIG. 7.

FIG. 1 is an exploded perspective view showing a foldable display device according to an exemplary embodiment.

Referring to FIG. 1, a foldable display device 1000 according to an exemplary embodiment includes a flexible display panel 100 and a folding unit 200.

The flexible display panel 100 includes a flexible substrate, such as polyimide, and a display unit for displaying an image. The flexible display panel 100 may be an organic light emitting diode display, a liquid crystal display, an electrophoretic display, etc., however it is not limited thereto. The flexible display panel 100 may include a window, a protection film, a touch unit, etc. Components included in the flexible display panel 100 may be adhered by an adhesive.

The flexible display panel 100 includes a front surface 101 for displaying an image and a rear surface 102 positioned at a side opposite to the front surface 101. The flexible display panel 100 is supported by the folding unit 200, and may be out-folded and in-folded by the folding unit 200.

Here, the out-folding means that the front surface 101 of the flexible display panel 100 is exposed outside the folded folding unit 200.

Also, the in-folding means that the portions of the front surface 101 of the flexible display panel 100 corresponding to the supporting portions 210 and 220 face each other and the front surface 101 of the flexible display panel 100 is positioned inside the folded folding unit 200.

The flexible display panel 100 includes a first portion 110, a second portion 120, and a bending portion 130.

The first portion 110 is adjacent to the bending portion 130 and overlaps a first supporting portion 210. The first portion 110 is supported by the first supporting portion 210. The first portion 110 may be fixed to the first supporting portion 210.

The second portion 120 is separated from the first portion 110 via the bending portion 130 interposed therebetween. The second portion 120 overlaps a second supporting portion 220. The second portion 120 is supported by the second supporting portion 220. The second portion 120 may be fixed to the second supporting portion 220.

The bending portion 130 is a portion that is bent during the out-folding and the in-folding of the flexible display panel 100. The bending portion 130 is positioned between the first portion 110 and the second portion 120. The bending portion 130 may overlap a hinge unit 230 and may be supported by the hinge unit 230. The bending portion 130 may be separated from or in contact with the hinge unit 230.

The folding unit 200 supports the flexible display panel 100 and in-folds and out-folds the front surface 101 of the flexible display panel 100.

The folding unit 200 includes the first supporting portion 210, the second supporting portion 220, and the hinge unit 230.

The first supporting portion 210 is connected to the hinge unit 230 and supports the first portion 110 of the flexible display panel 100. The first supporting portion 210 is in contact with the rear surface 102 of the flexible display panel 100. The adhesive may be positioned between the first supporting portion 210 and the first portion 110. The rear surface 102 of the flexible display panel 100 may be attached to the first supporting portion 210.

The second supporting portion 220 is connected to the hinge unit 230 and supports the second portion 120 of the flexible display panel 100. The second supporting portion 220 is in contact with the rear surface 102 of the flexible display panel 100. The adhesive may be positioned between the second supporting portion 220 and the second portion 120. The rear surface 102 of the flexible display panel 100 may be attached to the second supporting portion 220.

The hinge unit 230 simultaneously bends and supports the bending portion 130 of the flexible display panel 100 in a clockwise direction and a counterclockwise direction. The hinge unit 230 connects between the first supporting portion 210 and the second supporting portion 220. The hinge unit 230 overlaps the bending portion 130 of the flexible display panel 100 and supports the bending portion 130 of the flexible display panel 100. The hinge unit 230 is in contact with the rear surface 102 of the flexible display panel 100. A space may be positioned between the hinge unit 230 and the rear surface 102 of the flexible display panel 100, and the hinge unit 230 may be in contact with or separated from the rear surface 102 of the flexible display panel 100.

The hinge unit 230 includes a plurality of shafts 231, a plurality of links 232, a plurality of folding guides 233, and a plurality of rollers 234.

Figure 2:
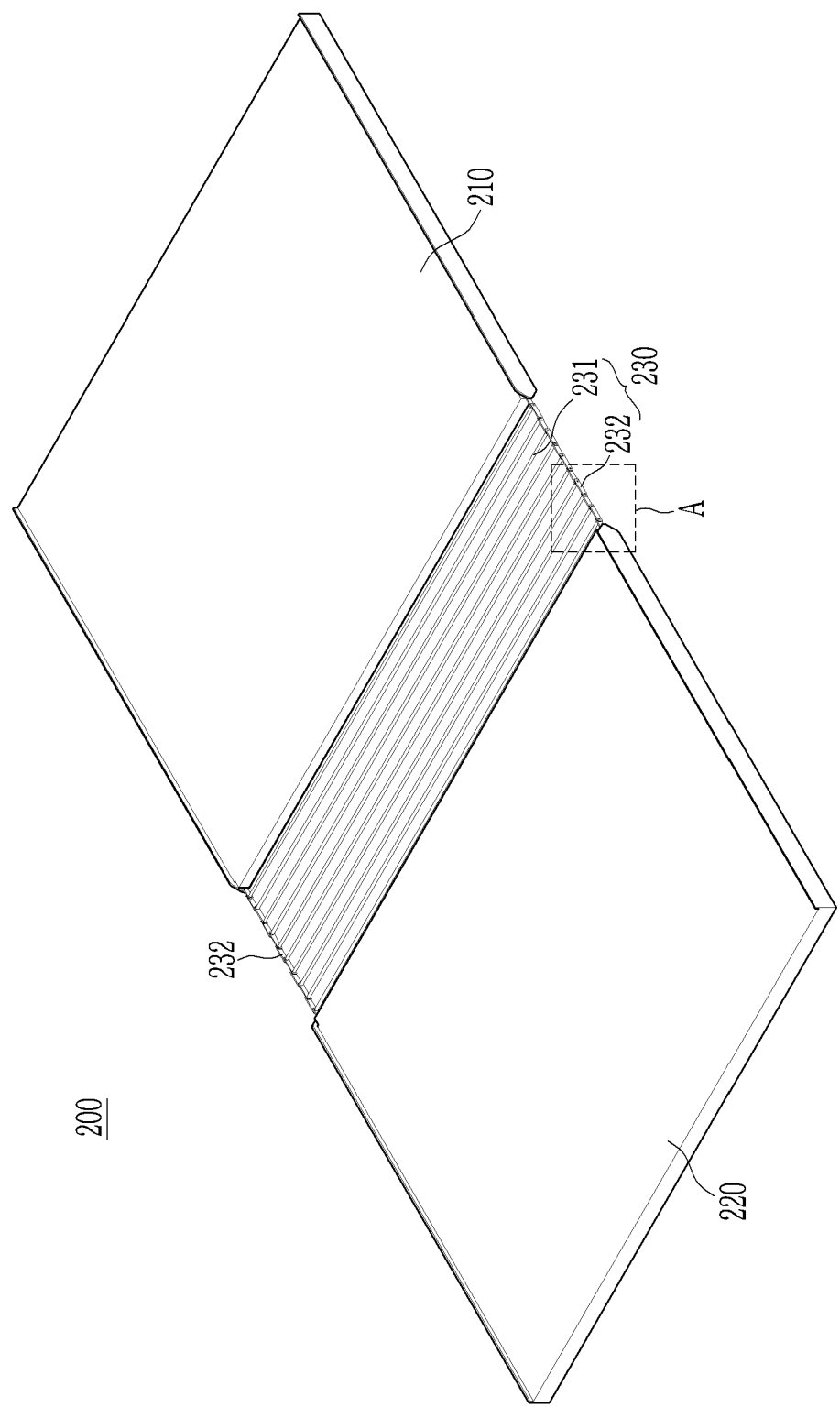
FIG. 2 is a perspective view showing a first supporting portion, a second supporting portion, and shafts and links of a hinge unit of a folding unit shown in FIG. 1.

FIG. 2 is a perspective view showing a first supporting portion, a second supporting portion, and shafts and links of a hinge unit of a folding unit shown in FIG. 1.

Figure 3:
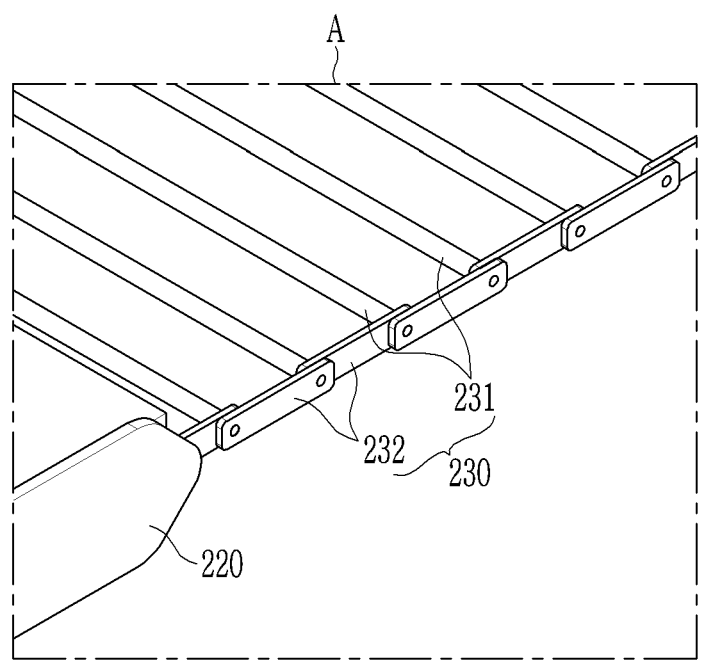
FIG. 3 is a perspective view of a portion A of FIG. 2.

FIG. 3 is a perspective view of a portion A of FIG. 2.

Referring to FIG. 2 and FIG. 3, the plurality of shafts 231 are disposed between the first supporting portion 210 and the second supporting portion 220. The ends of the plurality of shafts 231 are connected to the plurality of links 232 to be rotatable. The plurality of shafts 231 may connect the plurality of links 232 by penetrating the overlapped portion of the adjacent links 232 among the plurality of links 232.

The plurality of links 232 are connected between the plurality of shafts 231 to be rotatable. The plurality of links 232 connect between the ends of the plurality of shafts 231. The outermost links among the plurality of links 232 are connected to each of the first supporting portion 210 and the second supporting portion 220. In the present exemplary embodiment, the plurality of links 232 have a bar shape. However the inventive concepts are not limited thereto, and the links 232 may have various other shapes.

Figure 4:
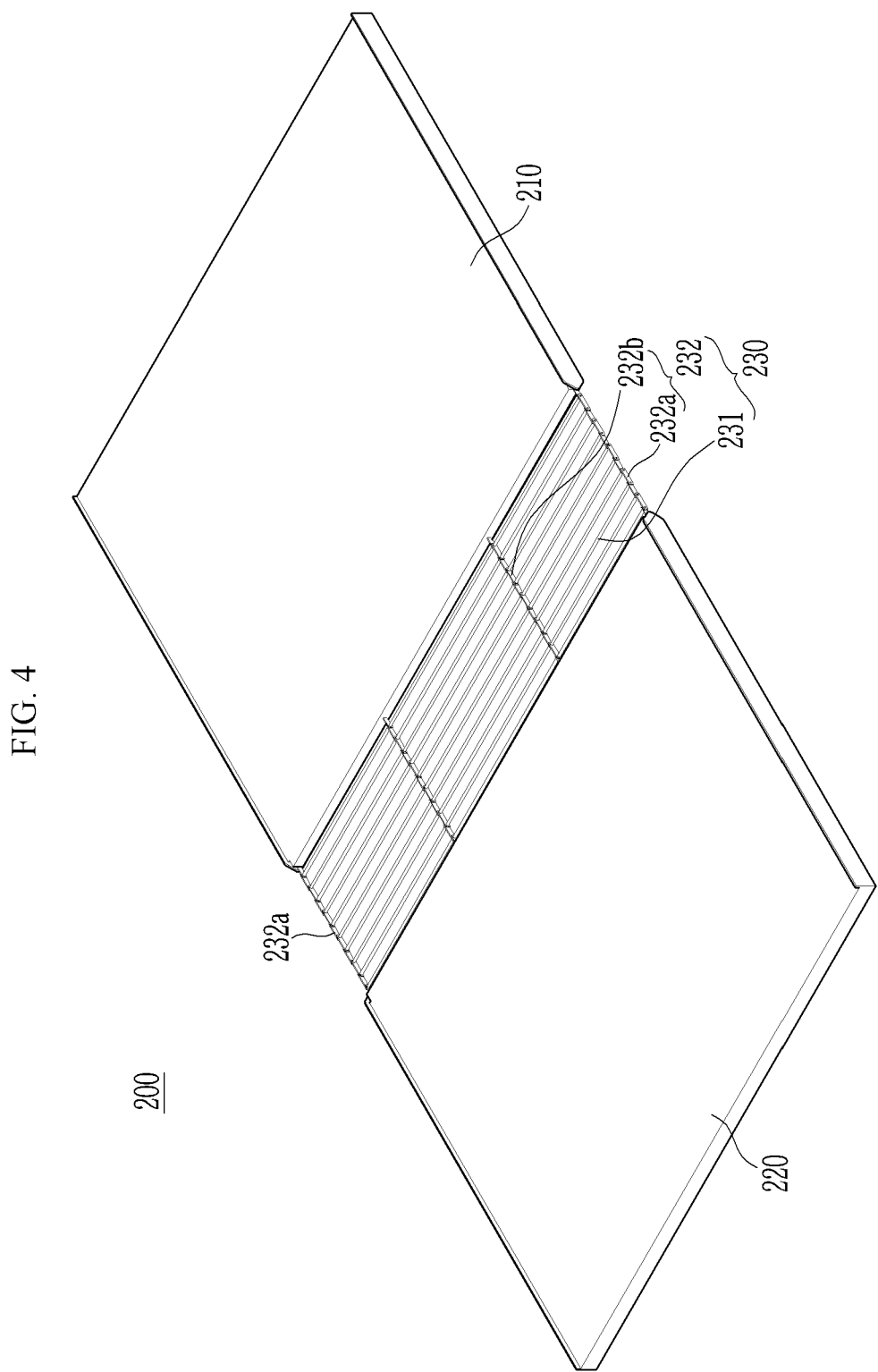
FIG. 4 is a perspective view showing another example of a folding unit of a foldable display device according to an exemplary embodiment.

FIG. 4 is a perspective view showing another example of a folding unit of a foldable display device according to an exemplary embodiment.

As another example of the above-described folding unit 200, the plurality of links 232 may include a plurality of outer links 232a and a plurality of inner links 232b.

The plurality of outer links 232a connect the ends of the plurality of shafts 231. The plurality of outer links 232a are connected to the ends of the plurality of shafts 231.

The plurality of inner links 232b are separated from the plurality of outer links 232a. The plurality of inner links 232b connect between inner portions of the plurality of shafts 231. The plurality of inner links 232b are connected to portions of the plurality of shafts 231.

Figure 5:
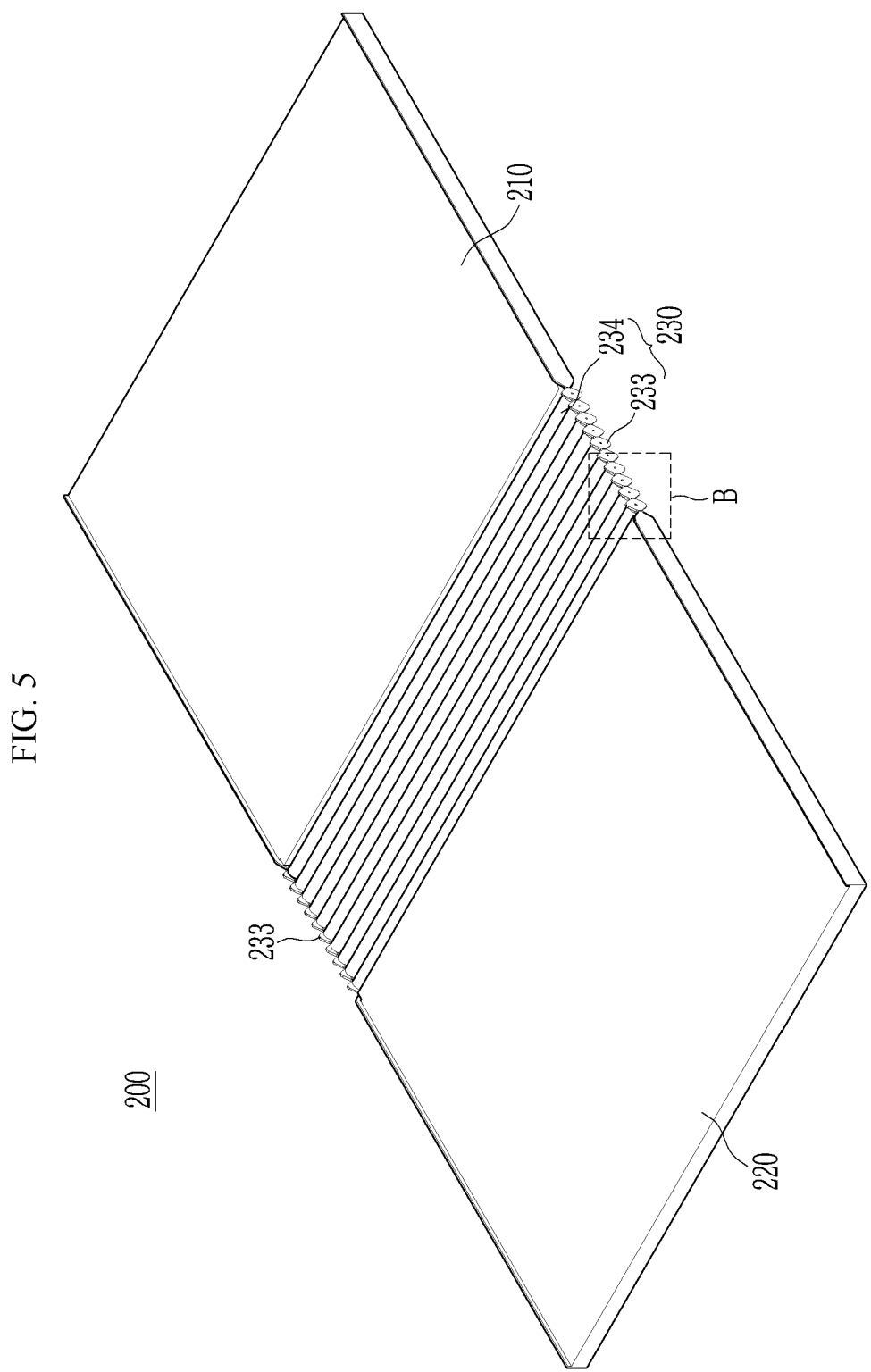
FIG. 5 is a perspective view showing a folding unit shown in FIG. 1.
Figure 6:
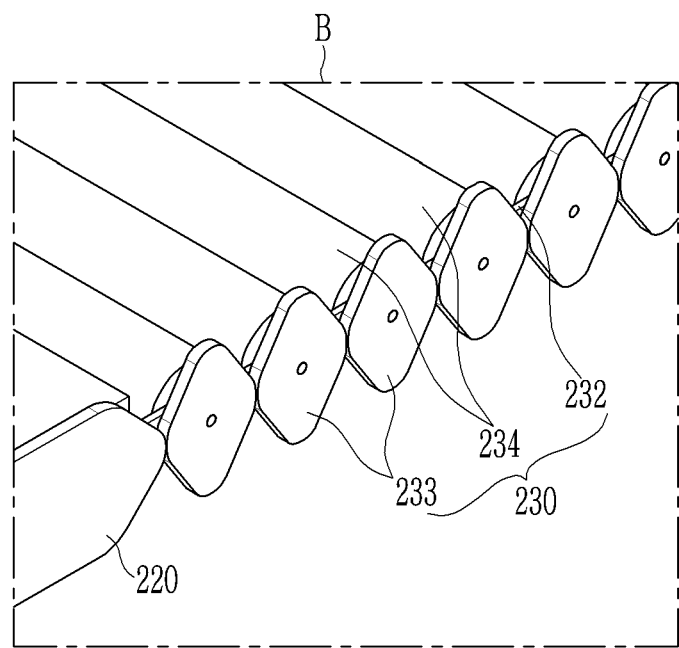
FIG. 6 is a perspective view of a portion B of FIG. 5.

FIG. 5 is a perspective view showing a folding unit shown in FIG. 1. FIG. 6 is a perspective view of a portion B of FIG. 5.

Referring to FIG. 5 and FIG. 6, the plurality of folding guides 233 of the hinge unit 230 are supported by the ends of the plurality of shafts 231. The plurality of folding guides 233 are supported by the ends of the plurality of shafts 231 to be rotatable adjacent to the plurality of links 232. In the present exemplary embodiment, the plurality of folding guides 233 may be rotated according to the rotation of the plurality of shafts 231. However, the inventive concepts are not limited thereto, and the folding guides 233 may be rotated regardless of the rotation of the plurality of shafts 231.

Each of the plurality of folding guides 233 may be supported by each end of the plurality of shafts 231. The plurality of folding guides 233 may set a curvature of the bending portion 130 of the flexible display panel 100.

The plurality of shafts 231 are inserted inside the plurality of rollers 234. Each of the plurality of rollers 234 covers each surface of the plurality of shafts 231. The plurality of rollers 234 may include a polymer or rubber. The plurality of rollers 234 may be supported by the plurality of shafts 231 to be rotatable.

Next, the above-described hinge unit 230 is described in detail with reference to FIG. 7.

Figure 7:
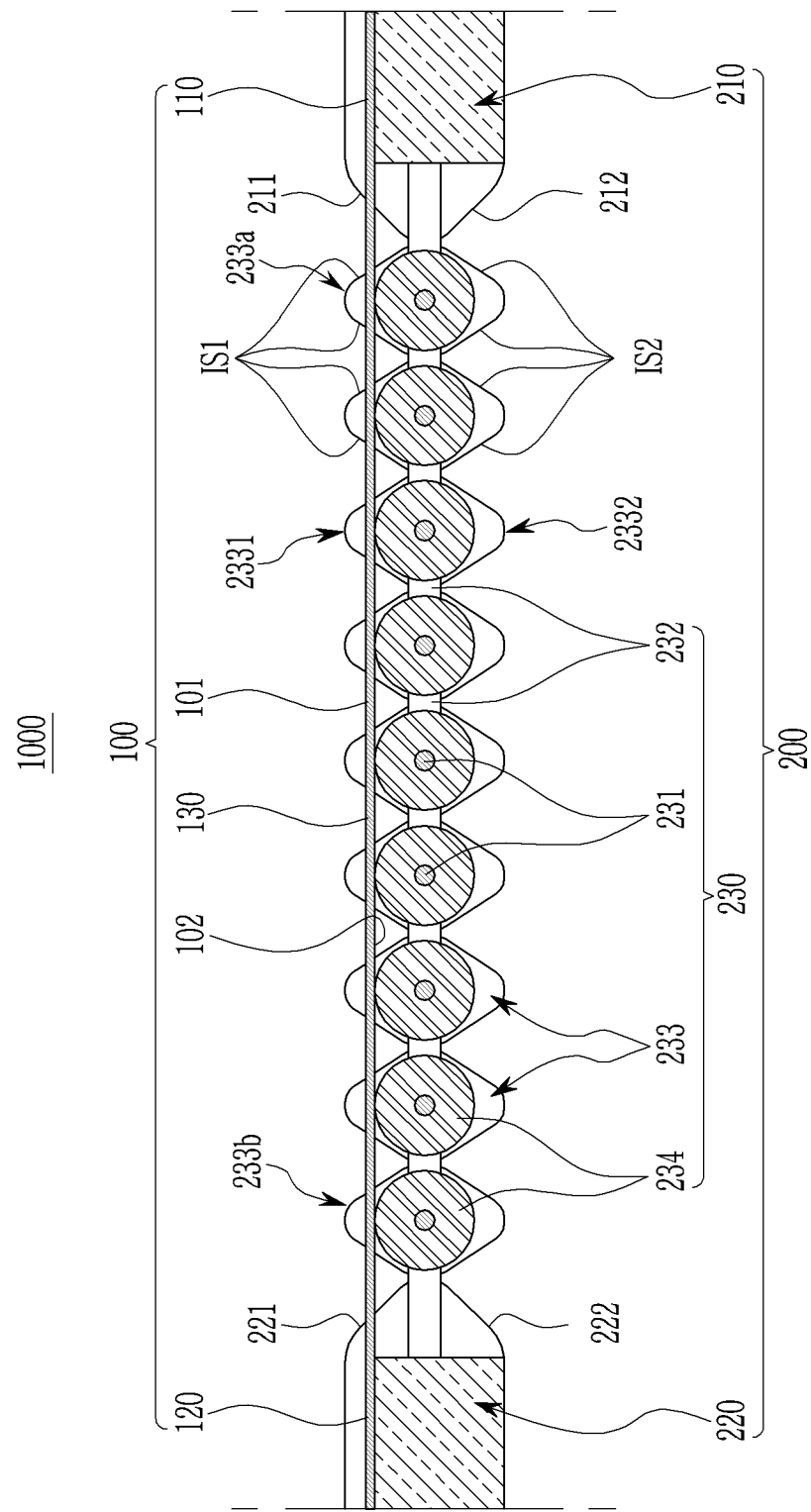
FIG. 7 is a cross-sectional view showing a foldable display device according to an exemplary embodiment.

FIG. 7 is a cross-sectional view showing a foldable display device according to an exemplary embodiment. FIG. 7 is a cross-sectional view showing the portion where the hinge unit of the foldable display device according to an exemplary embodiment is positioned.

Referring to FIG. 7, the plurality of shafts 231, the plurality of links 232, the plurality of folding guides 233, and the plurality of rollers 234 are included in the hinge unit 230, and the hinge unit 230 overlaps the bending portion 130 of the flexible display panel 100 to support the bending portion 130.

In the present exemplary embodiment, each of the plurality of folding guides 233 has a hexagonal shape. However, the inventive concepts are not limited thereto, and each of the folding guides 233 may have a polygonal shape, such as triangle, quadrangle, pentagon, heptagon, octagon, etc., or a shape such as a circle, an ellipse, or the like.

Each of the plurality of folding guides 233 includes a first guide 2331 and a second guide 2332.

The first guide 2331 is adjacent to the flexible display panel 100, and includes a plurality of first inclination surfaces IS1 that are symmetrical to each other. The plurality of first inclination surfaces IS1 may be asymmetrical. The number of the plurality of first inclination surfaces IS1 may be two, however, the inventive concepts are not limited thereto.

The second guide 2332 is positioned at the opposite side to the first guide 2331. The second guide 2332 is separated from the flexible display panel 100 compared with the first guide 2331. The second guide 2332 includes a plurality of second inclination surfaces IS2 that are symmetrical to each other. The plurality of second inclination surfaces IS2 may be asymmetrical. The number of the plurality of second inclination surfaces IS2 may be two, but the inventive concepts are not limited thereto.

The plurality of folding guides 233 includes a first outermost folding guide 233a adjacent to the first supporting portion 210, and a second outermost folding guide 233b adjacent to the second supporting portion 220.

The first supporting portion 210 includes a third inclination surface 211 that is symmetrical to a facing one among the plurality of first inclination surfaces IS1 of the first guide 2331 of the first outermost folding guide 233a. Also, the first supporting portion 210 includes a fourth inclination surface 212 that is symmetrical to a facing one among the plurality of second inclination surfaces IS2 of the second guide 2332 of the first outermost folding guide 233a.

That is, the first guide 2331 of the first outermost folding guide 233a faces the third inclination surface 211 of the first supporting portion 210, and the second guide 2332 of the first outermost folding guide 233a faces the fourth inclination surface 212 of the first supporting portion 210.

The second supporting portion 220 includes a fifth inclination surface 221 that is symmetrical to a facing one among the plurality of first inclination surfaces IS1 of the first guide 2331 of the second outermost folding guide 233b. In addition, the second supporting portion 220 includes a sixth inclination surface 222 that is symmetrical to a facing one among the plurality of second inclination surfaces IS2 of the second guide 2332 of the second outermost folding guide 233b.

That is, the first guide 2331 of the second outermost folding guide 233b faces the fifth inclination surface 221 of the second supporting portion 220, and the second guide 2332 of the second outermost folding guide 233b faces the sixth inclination surface 222 of the second supporting portion 220.

In the present exemplary embodiment, the plurality of above-described folding guides 233 are positioned adjacent to the plurality of links 232. However, the inventive concepts are not limited thereto, and the plurality of folding guides may be integrally formed with the plurality of links.

The above-described folding unit 200 supports the rear surface 102 of the flexible display panel 100, thereby in-folding and out-folding the front surface 101 of the flexible display panel 100. In this case, the hinge unit 230 of the folding unit 200 bends and supports the bending portion 130 of the flexible display panel 100 in the clockwise direction and the counterclockwise direction simultaneously.

Accordingly, because the curvature of the bending portion 130 of the flexible display panel 100 may be minimized, the flexible display panel 100 is suppressed from being damaged by a stress during the in-folding and the out-folding of the flexible display panel 100.

The out-folding and the in-folding of this foldable display device will now be described in detail.

The out-folding of the foldable display device according to an exemplary embodiment is described with reference to FIG. 8.

Figure 8:
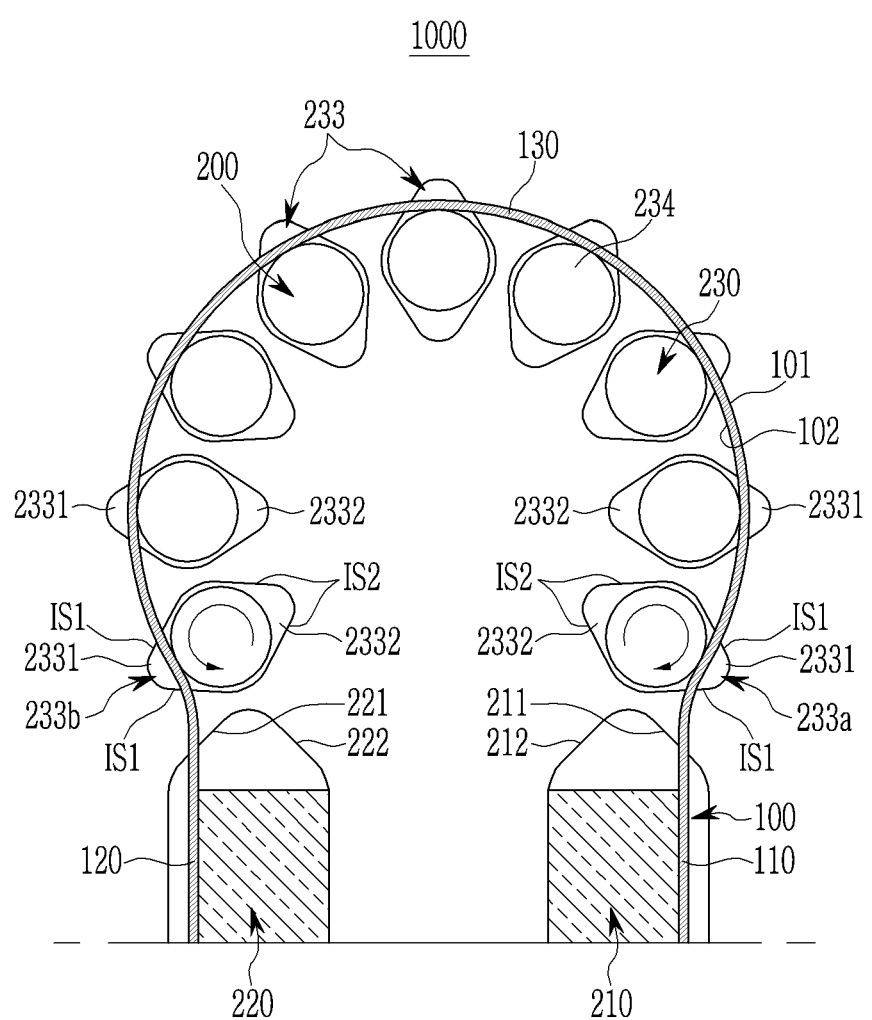
FIG. 8 is a cross-sectional view showing out-folding of a foldable display device according to an exemplary embodiment.

FIG. 8 is a cross-sectional view showing out-folding of a foldable display device according to an exemplary embodiment. FIG. 8 shows the folding guides and the rollers in the hinge unit.

Referring to FIG. 8, the foldable display device 1000 is out-folded so that the front surface 101 of the flexible display panel 100 is exposed outside the folded folding unit 200.

The first outermost folding guide 233a adjacent to the first supporting portion 210 is rotated in the clockwise direction with respect to the first supporting portion 210, and the remaining folding guides 233, except for the first outermost folding guide 233a, are rotated in the counterclockwise direction with respect to the first supporting portion 210.

One among the first inclination surfaces IS1 of the first guide 2331 of the first outermost folding guide 233a may be in contact with the third inclination surface 211 of the first supporting portion 210.

The second outermost folding guide 233b adjacent to the second supporting portion 220 is rotated in the counterclockwise direction with respect to the second supporting portion 220, and the folding guides 233, except for the second outermost folding guide 233b, are rotated in the clockwise direction with respect to the second supporting portion 220.

One among the first inclination surfaces IS1 of the first guide 2331 of the second outermost folding guide 233b may be in contact with the fifth inclination surface 221 of the second supporting portion 220.

The second guide 2332 of the first outermost folding guide 233a is separated from the first supporting portion 210, the second guide 2332 of the second outermost folding guide 233b is separated from the second supporting portion 220, and the second guides 2332 of the plurality of folding guides 233 are adjacent to each other. The second guides 2332 of the plurality of folding guides 233 may be in contact with each other.

Accordingly, the folding unit 200 out-folds the front surface 101 of the flexible display panel 100.

As described above, as the hinge unit 230 of the folding unit 200 simultaneously bends and supports the bending portion 130 of the flexible display panel 100 in the clockwise direction and the counterclockwise direction, because the curvature of the bending portion 130 of the flexible display panel 100 may be minimized, the flexible display panel 100 may be suppressed from being damaged by the stress during the out-folding of the flexible display panel 100.

Next, the in-folding of the foldable display device according to an exemplary embodiment is described with reference to FIG. 9.

Figure 9:
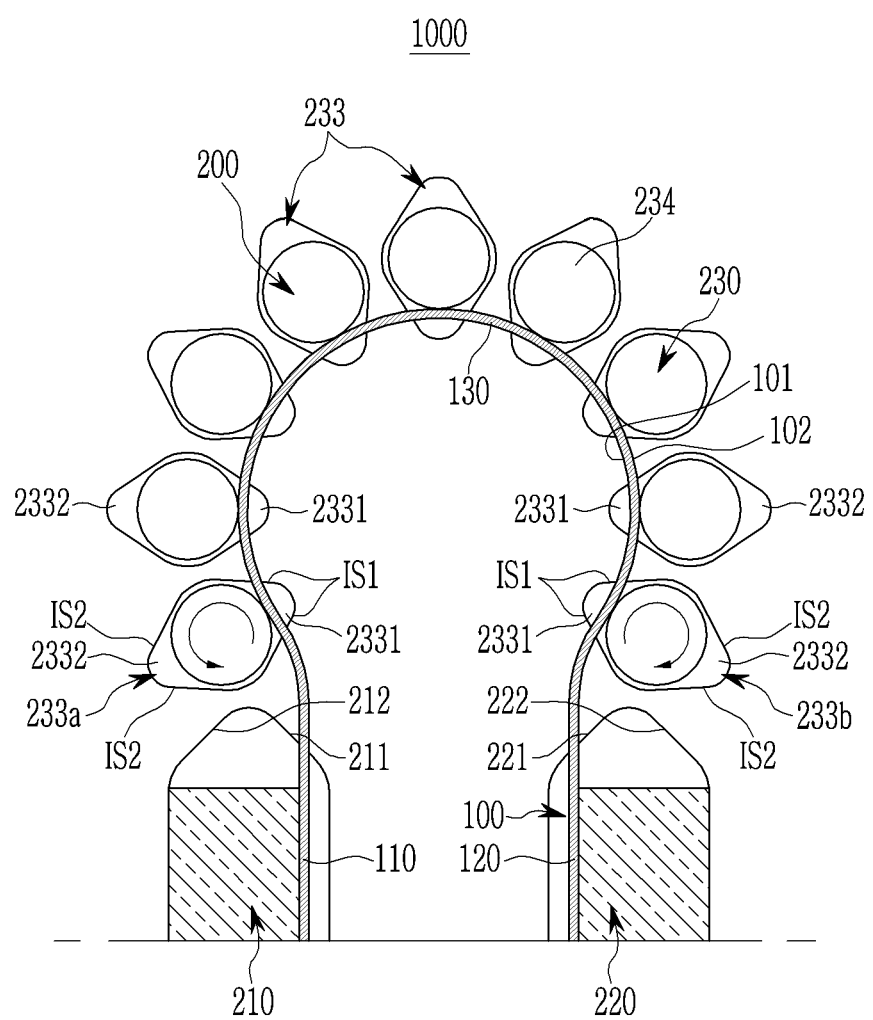
FIG. 9 is a cross-sectional view showing in-folding of a foldable display device according to an exemplary embodiment.

FIG. 9 is a cross-sectional view showing an in-folding of a foldable display device according to an exemplary embodiment.

Referring to FIG. 9, the foldable display device 1000 is in-folded so that the portions of the front surface 101 of the flexible display panel 100 corresponding to the supporting portions 210 and 220 face each other and the front surface 101 of the flexible display panel 100 is positioned inside the folded folding unit 200.

The first outermost folding guide 233a adjacent to the first supporting portion 210 is rotated in the counterclockwise direction with respect to the first supporting portion 210, and the folding guides 233, except for the first outermost folding guide 233a, are rotated in the clockwise direction with respect to the first supporting portion 210.

One among the second inclination surfaces IS2 of the second guide 2332 of the first outermost folding guide 233a may be in contact with the fourth inclination surface 212 of the first supporting portion 210.

The second outermost folding guide 233b adjacent to the second supporting portion 220 is rotated in the clockwise direction with respect to the second supporting portion 220, and the remaining folding guides 233, except for the second outermost folding guide 233b, are rotated in the counterclockwise direction with respect to the second supporting portion 220.

One among the second inclination surfaces IS2 of the second guide 2332 of the second outermost folding guide 233b may be in contact with the sixth inclination surface 222 of the second supporting portion 220.

The first guide 2331 of the first outermost folding guide 233a is separated from the first supporting portion 210, the first guide 2331 of the second outermost folding guide 233b is separated from the second supporting portion 220, and the first guides 2331 of the plurality of folding guides 233 are adjacent to each other. The first guides 2331 of the plurality of folding guides 233 may be in contact with each other.

Accordingly, the folding unit 200 in-folds the front surface 101 of the flexible display panel 100.

As described above, as the hinge unit 230 of the folding unit 200 simultaneously bends and supports the bending portion 130 of the flexible display panel 100 in the clockwise direction and the counterclockwise direction, because the curvature of the bending portion 130 of the flexible display panel 100 may be minimized, the flexible display panel 100 may be suppressed from being damaged by the stress during the out-folding of the flexible display panel 100.

As described above, as the folding unit 200 bending and supporting the bending portion 130 of the flexible display panel 100 in the clockwise direction and the counterclockwise direction simultaneously, the foldable display device 1000 in which the flexible display panel 100 is suppressed from being damaged by the stress during the in-folding and the out-folding of the flexible display panel 100 is provided by minimizing the curvature of the bending portion 130 of the flexible display panel 100.

Next, the foldable display device according to another exemplary embodiment is described with reference to FIG. 10. Hereinafter, different parts of the above-described exemplary embodiment are described.

Figure 10:
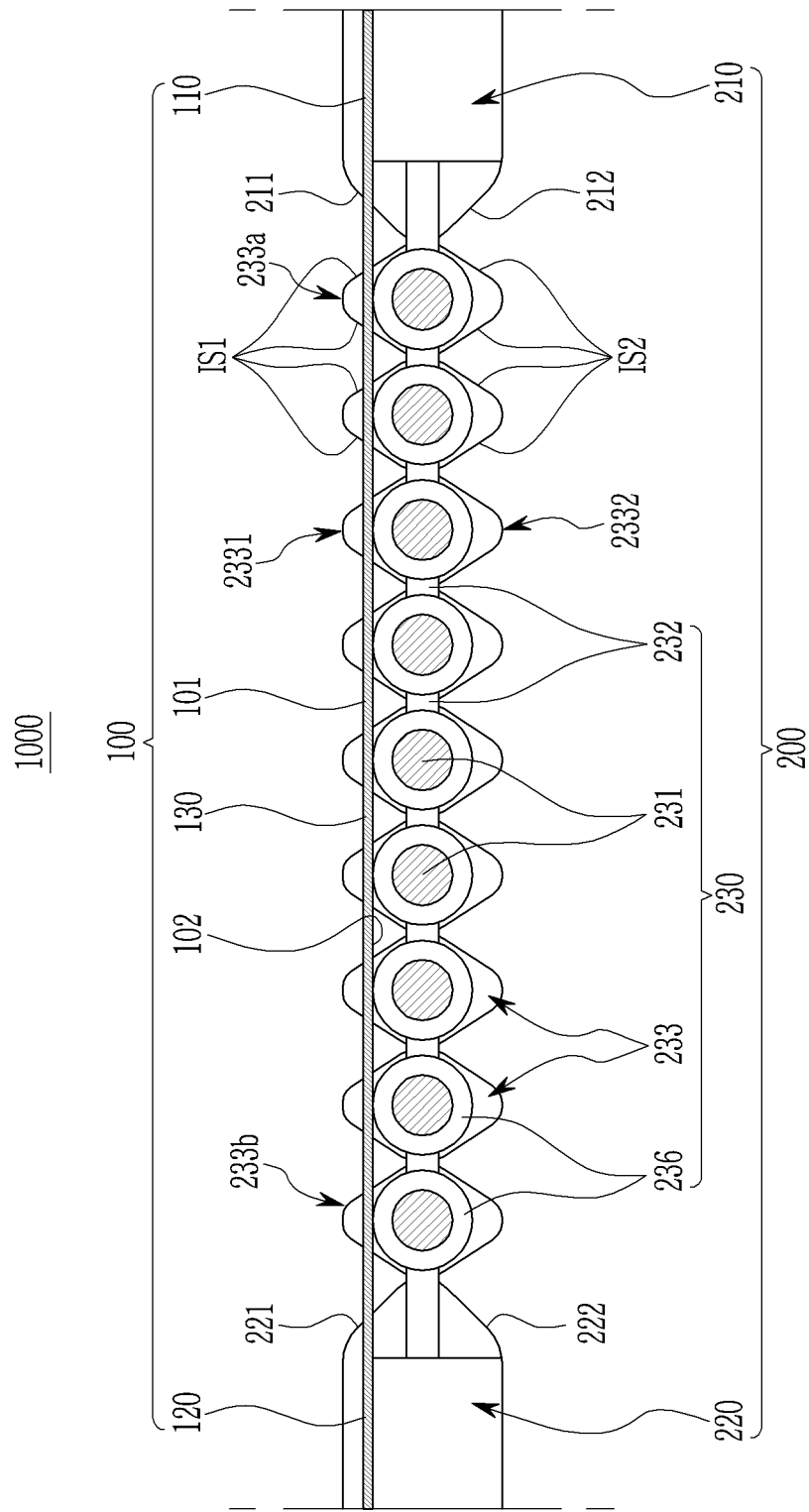
FIG. 10 is a cross-sectional view showing a foldable display device according to another exemplary embodiment.

FIG. 10 is a cross-sectional view showing a foldable display device according to another exemplary embodiment.

Referring to FIG. 10, the hinge unit 230 of the foldable display device 1000 according to another exemplary embodiment includes a plurality of shafts 231, a plurality of links 232, a plurality of folding guides 233, and a plurality of coating layers 236.

Each of the plurality of coating layers 236 is coated to each surface of the plurality of shafts 231. On the other hand, at least one among the coating layers 236 may not be coated to at least one surface among the plurality of shafts 231. That is, each of the coating layers 236 is coated to at least one surface among the plurality of shafts 231.

Each of the plurality of coating layers 236 covers each surface of the plurality of shafts 231. The plurality of coating layers 236 may include a polymer or rubber. The plurality of coating layers 236 may be rotated according to the rotation of the plurality of shafts 231.

As described above, in the foldable display device 1000 according to another exemplary embodiment, as each of the plurality of coating layers 236 is coated on each surface of the a plurality of shafts 231, when the hinge unit 230 simultaneously bends and supports the bending portion 130 of the flexible display panel 100 in the clockwise direction and the counterclockwise direction, the bending portion 130 of the flexible display panel 100 is suppressed from being damaged by the interference due to the hinge unit 230.

Next, the foldable display device according to another exemplary embodiment is described with reference to FIG. 11. Hereinafter, different parts of the above-described exemplary embodiment are described.

Figure 11:
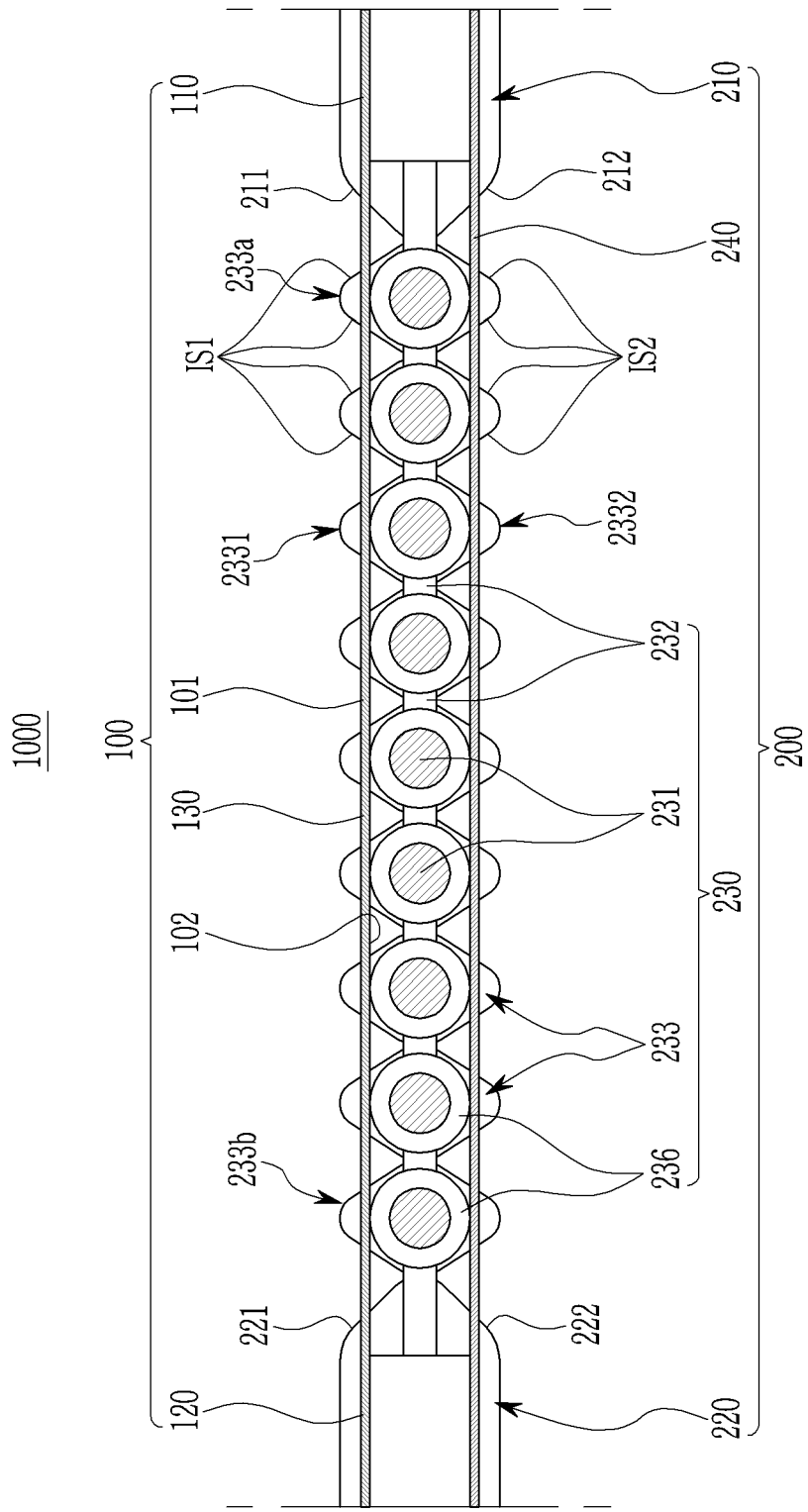
FIG. 11 is a cross-sectional view showing a foldable display device according to another exemplary embodiment.

FIG. 11 is a cross-sectional view showing a foldable display device according to another exemplary embodiment.

Referring to FIG. 11, the folding unit 200 of the foldable display device 1000 according to another exemplary embodiment includes a first supporting portion 210, a second supporting portion 220, a hinge unit 230, and a stretchable film 240.

The stretchable film 240 overlaps the hinge unit 230 and connects the first supporting portion 210 and the second supporting portion 220. The hinge unit 230 is positioned between the stretchable film 240 and the flexible display panel 100.

The stretchable film 240 includes the rubber, and may have a characteristic such that it is easily stretched. The stretchable film 240 may include at least one among a plurality of through-holes, a plurality of depressed portions, a plurality of slits, etc.

As above-described, in the foldable display device 1000 according to another exemplary embodiment, as the folding unit 200 includes the stretchable film 240 connecting the first supporting portion 210 and the second supporting portion 220, when the hinge unit 230 bends and supports the bending portion 130 of the flexible display panel 100 simultaneously in the clockwise direction and the counterclockwise direction, as the stretchable film 240 is stretched such that an elastic restoring force is generated, when the folded foldable display device 1000 is unfolded, the foldable display device 1000 is easily unfolded to be flat.

Next, the foldable display device according to another exemplary embodiment is described with reference to FIG. 12. Hereinafter, different parts of the above-described exemplary embodiment are described.

Figure 12:
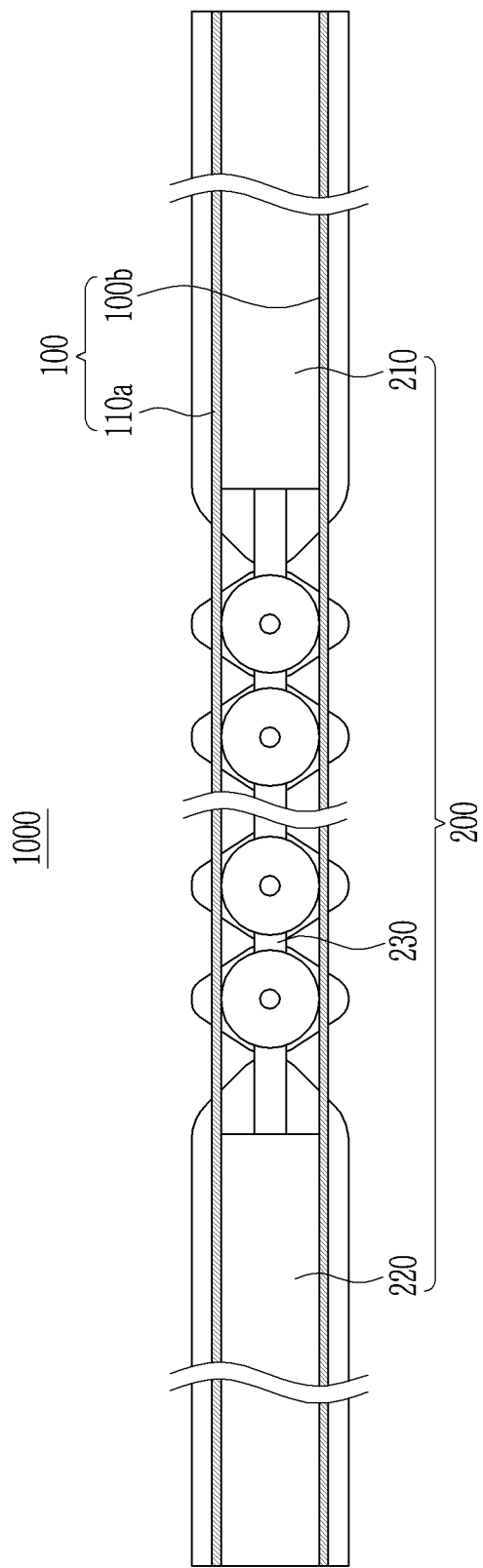
FIG. 12 is a cross-sectional view showing a foldable display device according to another exemplary embodiment.

FIG. 12 is a cross-sectional view showing a foldable display device according to another exemplary embodiment.

Referring to FIG. 12, the foldable display device 1000 according to another exemplary embodiment includes the flexible display panel 100 and the folding unit 200.

The flexible display panel 100 includes a first sub-flexible display panel 100a and a second sub-flexible display panel 100b.

The first sub-flexible display panel 100a is positioned at one side of the folding unit 200, and the second sub-flexible display panel 100b is positioned at the other side of the folding unit 200. The folding unit 200 is positioned between the first sub-flexible display panel 100a and the second sub-flexible display panel 100b.

In the foldable display device 1000 according to another exemplary embodiment, if the front surface of the first sub-flexible display panel 100a is out-folded, the front surface of the second sub-flexible display panel 100b is in-folded. Also, in the foldable display device 1000, if the front surface of the first sub-flexible display panel 100a is in-folded, the front surface of the second sub-flexible display panel 100b is out-folded.

As described above, as the folding unit 200 bending and supporting each bending portion of the first sub-flexible display panel 100a and the second sub-flexible display panel 100b in the clockwise direction and the counterclockwise direction simultaneously, the foldable display device 1000 in which the first sub-flexible display panel 100a and the second sub-flexible display panel 100b are suppressed from being damaged by the stress during the in-folding and the out-folding of the first sub-flexible display panel 100a and the second sub-flexible display panel 100b is provided by minimizing the curvature of each bending portion of the first sub-flexible display panel 100a and the second sub-flexible display panel 100b.

Next, the foldable display device according to another exemplary embodiment is described with reference to FIG. 13. Hereinafter, different parts of the above-described exemplary embodiment are described.

FIG. 13 is a cross-sectional view showing a foldable display device according to another exemplary embodiment.

Referring to FIG. 13, the foldable display device 1000 according to another exemplary embodiment includes the flexible display panel 100 and the folding unit 200.

The front surface 101 of the flexible display panel 100 encloses the folding unit 200.

The flexible display panel 100 encloses each upper side and lower side of the first supporting portion 210, the hinge unit 230, and the second supporting portion 220 of the folding unit 200.

A first end portion 215 of the first supporting portion 210 has a curved surface shape, and the front surface 101 of the flexible display panel 100 enclosing the first end portion 215 of the curved surface forms the curved surface.

A second end portion 225 of the second supporting portion 220 has the curved surface shape, and the front surface 101 of the flexible display panel 100 enclosing the second end portion 225 of the curved surface forms the curved surface.

The folding unit 200 is positioned inside the flexible display panel 100.

As above-described, as the folding unit 200 positioned inside the flexible display panel 100 and bending and supporting the bending portion of the flexible display panel 100 in the clockwise direction and the counterclockwise direction is included, the foldable display device 1000 in which the flexible display panel 100 is suppressed from being damaged by the stress during the in-folding and out-folding of the flexible display panel 100 is provided by minimizing the curvature of the bending portion of the flexible display panel 100.

According to exemplary embodiments, the foldable display device in which the curvature of the bending portion of the flexible display panel is minimized during the folding is provided.

Although certain exemplary embodiments have been described herein, other embodiments and modifications will be apparent from this description. Accordingly, the inventive concepts are not limited to such embodiments, but rather to the broader scope of the appended claims and various obvious modifications and equivalent arrangements as would be apparent to a person of ordinary skill in the art.

What is claimed is:

1. A foldable display device comprising:
    a flexible display panel comprising a bending portion; and
    a folding unit supporting the flexible display panel and configured to in-fold and out-fold a front surface of the flexible display panel,
    wherein:
    the folding unit comprises a hinge unit configured to bend and support the bending portion of the flexible display panel simultaneously;
    the flexible display panel is folded, a middle portion of the bending portion has a first curvature, and an end portion of the bending portion has a second curvature; and
    a center of the second curvature is disposed in an outer space of the flexible display panel, and a center of the first curvature is disposed in an inner space of the flexible display panel.

2. The foldable display device of claim 1, wherein:
    the flexible display panel further comprises:
    a first portion adjacent to the bending portion; and
    a second portion separated from the first portion via the bending portion, and
    the folding unit further comprises:
    a first supporting portion connected to the hinge unit and supporting the first portion; and
    a second supporting portion connected to the hinge unit and supporting the second portion.

3. The foldable display device of claim 2, wherein the first supporting portion and the second supporting portion are in contact with a rear surface of the flexible display panel.

4. The foldable display device of claim 3, wherein:
    the rear surface of the flexible display panel is attached to the first supporting portion and the second supporting portion; and
    the rear surface of the flexible display panel is in contact with the hinge unit.

5. The foldable display device of claim 2, wherein the hinge unit comprises:
    a plurality of rotatable shafts disposed between the first supporting portion and the second supporting portion;
    a plurality of links connected between the rotatable shafts; and
    a plurality of folding guides supported by end portions of the rotatable shafts.

6. The foldable display device of claim 5, wherein the hinge unit further comprises a plurality of rollers into which the rotatable shafts are inserted.

7. The foldable display device of claim 5, wherein the hinge unit further comprises a coating layer coated to at least one surface among the rotatable shafts.

8. The foldable display device of claim 5, wherein the links comprise:
    a plurality of outer links connected to end portions of the rotatable shafts; and
    a plurality of inner links separated from the outer links and connected to a portion of the rotatable shafts.

9. The foldable display device of claim 5, wherein each of the folding guides comprises:
    a first guide adjacent to the flexible display panel and comprising a plurality of first inclination surfaces that are symmetrical to each other; and
    a second guide separated from the flexible display panel and comprising a plurality of second inclination surfaces that are symmetrical with each other.

10. The foldable display device of claim 9, wherein the folding guides comprise a first outermost folding guide adjacent to the first supporting portion.

11. The foldable display device of claim 10, wherein the folding guides further comprise a second outermost folding guide adjacent to the second supporting portion.

12. The foldable display device of claim 11, wherein:
    when the folding unit out-folds the front surface of the flexible display panel, the first outermost folding guide is rotated in a clockwise direction with respect to the first supporting portion: and
    the remaining folding guides, except for the first outermost folding guide, are rotated in a counterclockwise direction with respect to the first supporting portion.

13. The foldable display device of claim 12, wherein:
    the second outermost folding guide is rotated in a counterclockwise direction with respect to the second supporting portion; and
    the remaining folding guides, except for the second outermost folding guide, are rotated in a clockwise direction with respect to the second supporting portion.

14. The foldable display device of claim 13, wherein:
    the second guide of the first outermost folding guide is separated from the first supporting portion;
    the second guide of the second outermost folding guide is separated from the second supporting portion; and
    second guides of the folding guides are adjacent to each other.

15. The foldable display device of claim 11, wherein:
    when the folding unit in-folds the front surface of the flexible display panel, the first outermost folding guide is rotated in a counterclockwise direction with respect to the first supporting portion; and
    the remaining folding guides, except for the first outermost folding guide, are rotated in a clockwise direction with respect to the first supporting portion.

16. The foldable display device of claim 15, wherein:
    the folding guides further comprise a second outermost folding guide adjacent to the second supporting portion;
    the second outermost folding guide is rotated in a clockwise direction with respect to the second supporting portion; and
    the remaining folding guides, except for the second outermost folding guide, are rotated in a counterclockwise direction with respect to the second supporting portion.

17. The foldable display device of claim 16, wherein:
    the first guide of the first outermost folding guide is separated from the first supporting portion;
    the first guide of the second outermost folding guide is separated from the second supporting portion; and
    first guides of the folding guides are adjacent to each other.

18. The foldable display device of claim 11, wherein the first supporting portion comprises a third inclination surface that is symmetrical to one among the first inclination surfaces of the first guide of the first outermost folding guide.

19. The foldable display device of claim 18, wherein the first supporting portion comprises a fourth inclination surface that is symmetrical to one among the second inclination surfaces of the second guide of the first outermost folding guide.

20. The foldable display device of claim 11, wherein the second supporting portion comprises a fifth inclination surface that is symmetrical to one among the first inclination surfaces of the first guide of the second outermost folding guide.

21. The foldable display device of claim 20, wherein the second supporting portion comprises a sixth inclination surface that is symmetrical to one among the second inclination surfaces of the second guide of the second outermost folding guide.

22. The foldable display device of claim 2, wherein the folding unit further comprises a stretchable film overlapping the hinge unit and connecting between the first supporting portion and the second supporting portion.

23. The foldable display device of claim 1, wherein:
the flexible display panel further comprises:
a first sub-flexible display panel positioned at one side of the folding unit; and
a second sub-flexible display panel positioned at the other side of the folding unit, and
the folding unit is positioned between the first sub-flexible display panel and the second sub-flexible display panel.

24. The foldable display device of claim 1, wherein the front surface of the flexible display panel encloses the folding unit.

\* \* \* \* \*